3,062,807
SEPARATION OF NEOMYCINS
Gerard Nomine, Noisy-le-Sec, and Lucien Penasse, Paris, France, assignors, by mesne assignments, to Roussel-UCLAF, S.A., Paris, France, a corporation of France
No Drawing. Filed Mar. 1, 1961, Ser. No. 92,445
Claims priority, application France Mar. 8, 1960
1 Claim. (Cl. 260—210)

This invention relates to a novel process for the separation of neomycins into neomycin B and neomycin C.

Neomycins are produced by fermentation of *Streptomyces fradiae* which results in a mixture composed principally of neomycin B and neomycin C. Neomycin B is the more interesting of these two products since it has greater activity. Several researchers have attempted a separation or purification of the raw neomycin, but the attempted separations have, as stated by S. A. Waksman (Neomycin, Rutgers University Press, 1953, p. 74) proven "extremely difficult."

Jackson in U.S. Patent No. 2,848,365 proposed a process for purification of the neomycin complex by chromatography on charcoal activated by heat, but this process requires difficult filtrations and acid washings of the charcoal which are difficult and dangerous. Dutcher et al. in J. Am. Chem. Soc., vol. 73 (1951), pp. 1384–5, proposed chromatography on alumina previously washed with acid, but the resulting solutions were extremely dilute. Up to the present time there has not been any simple and practical commercial process to effect the separation of neomycin B and neomycin C.

It is an object of the invention to provide a simple and practical commercial process for the separation of neomycin B and neomycin C with high yields.

It is a further object of the invention to provide a process for the separation of neomycin B and neomycin C by absorption and selective elution of the mixture from ion exchange resins.

These and other objects and advantages will become obvious from the following detailed description.

The process of the invention comprises adsorbing the neomycin complex containing mixtures of neomycin B and neomycin C from an alkaline solution on a weakly acidic ion exchange resin such as the carboxylic acid exchange resins, fractionally eluting first neomycin C with an alkaline solvent and then neomycin B with the same alkaline solvent of higher concentration and recovering the desired neomycins. The elution is preferably effected with aqueous ammonia because the ammonia is easily removed by distillation of the eluate. The neomycin C is eluted with about 0.25 N aqueous ammonia and the neomycin B is eluted with about 1.0 N aqueous ammonia. After elution of the two neomycins, each may be purified by the usual techniques such as successive precipitations from methanol and decolorization treatment with animal charcoal.

The process of the invention permits the obtaining of neomycin B in a degree of purity and activity not heretofore obtainable and at the same time permits the recovery of neomycin C which is useful in veterinary medicine. The quantities of the products isolated in each of the fractions depends on the amount of neomycin B and C in the original mixture.

In the following example there are described several preferred embodiments to illustrate the invention. However, it should be understood that the invention is not intended to be limited to the specific embodiments.

*Example*

A solution of raw neomycin sulfate was obtained by elution with sulfuric acid of the raw neomycin base fixed on a column of carboxylic acid ion exchanger resin, sold in commerce under the trade name of "Amberlite IRC 50." The resin was in acid form. The solution of raw neomycin sulfate contained 10.9 gm. of neomycin base titrated by opacimetry. Concentrated ammonia was added to 1 liter of said solution in such a manner as to bring the solution to a pH of 9. This solution was then passed at an hourly rate of 0.3 volume of solution per volume of the resin into a chromatographic column containing 165 cc. of carboxylic acid ion exchanger resin in the ammoniated form. The resin is sold in commerce under the name of "Amberlite IRC 50" (polymer of acrylic acid having cross-linked bonds such as that described in United States Patent No. 2,340,111). The ratio of the height to the diameter of this column being approximately equal to 6. The column was then washed with 300 cc. of demineralized water. The effluent and the wash waters from the chromatographic column contained together less than 0.5% of active antibiotic. The column was next washed with 1 liter of 0.2 N ammonia at an hourly rate of 0.5 volume per volume of resin. This wash was equally free of active antibiotic product. The column was then eluted with 1 liter of 0.25 N ammonia at the same speed as the preceding wash and each time that an eluate of equal volume to the volume of resin was recovered, it was subjected to two tests, one by polarimetry ($Tp$) and the other chemical to determine the amount of ribose ($Tr$). The two tests were compared by reference to a standard amount of neomycin B and expressed in grams of neomycin base per liter. After each determination, the ratio $$\frac{Tp}{Tr}$$

was calculated. The elution with 0.25 N ammonia was followed until the ratio $$\frac{Tp}{Tr}$$

was less or equal to 1.2. At this moment the elution of the C isomer, which represents 27–36% of the total activity of the starting product, was terminated. The product obtained was satisfactory for veterinary usages.

The elution of the B isomer was effected with about 1 N ammonia at the same speed as the preceding elution and the optically active fractions were collected together.

There was obtained about 300 cc. of eluate of purified neomycin, containing 7.4 gm. of neomycin B base, opacimetric test being 68%, having the ratio $$\frac{Tp}{Tr} \leq 1.1$$

This second eluate was distilled under reduced pressure in nitrogen at a temperature below 40° C. until there was obtained a concentration of 15% neomycin, free from ammonia. The pH was brought to 6.5–6.7 by the addition of sulfuric acid. The solution was treated with animal charcoal in order to decolorize it, filtered and poured into methanol. By filtration, 9.4 gm. of neomycin sulfate were recovered containing 6.55 gm. of neomycin base, being a yield of 60%. The product tested, on opacimetric determination, 730 γ of standard neomycin per mg. of dry product.

Analyzed according to the first method of Brooks et al., Anal. Chem., 28, 1788 (1956), the product contained about 100% of neomycin B. Finally, examined according to the chromatographic method of the acylated derivative of S. C. Pan and J. D. Dutcher, Anal. Chem., 28, 836 (1956), the product was free of neomycin C.

Various modifications of the process of the invention may be made without departing from the spirit or scope thereof and it is to be understood that the invention be limited only as defined in the appended claim.

We claim:

A process for the separation of neomycin B and neomycin C from mixtures thereof comprising adsorbing a mixture of neomycin B and neomycin C on a carboxylic acid ion exchange resin, selectively eluting neomycin C with about 0.25 N aqueous ammonia, selectively eluting neomycin B with about 1.0 N aqueous ammonia and recovering neomycin B and neomycin C.

References Cited in the file of this patent

UNITED STATES PATENTS 2,799,620    Waksman et al. _____ July 16, 1957